F. ZEDLITZ.
APPARATUS FOR TESTING THREADS, WIRES, STRIPS, &c.
APPLICATION FILED JAN. 27, 1909.

946,743.

Patented Jan. 18, 1910.
4 SHEETS—SHEET 3.

Witnesses:

Inventor:

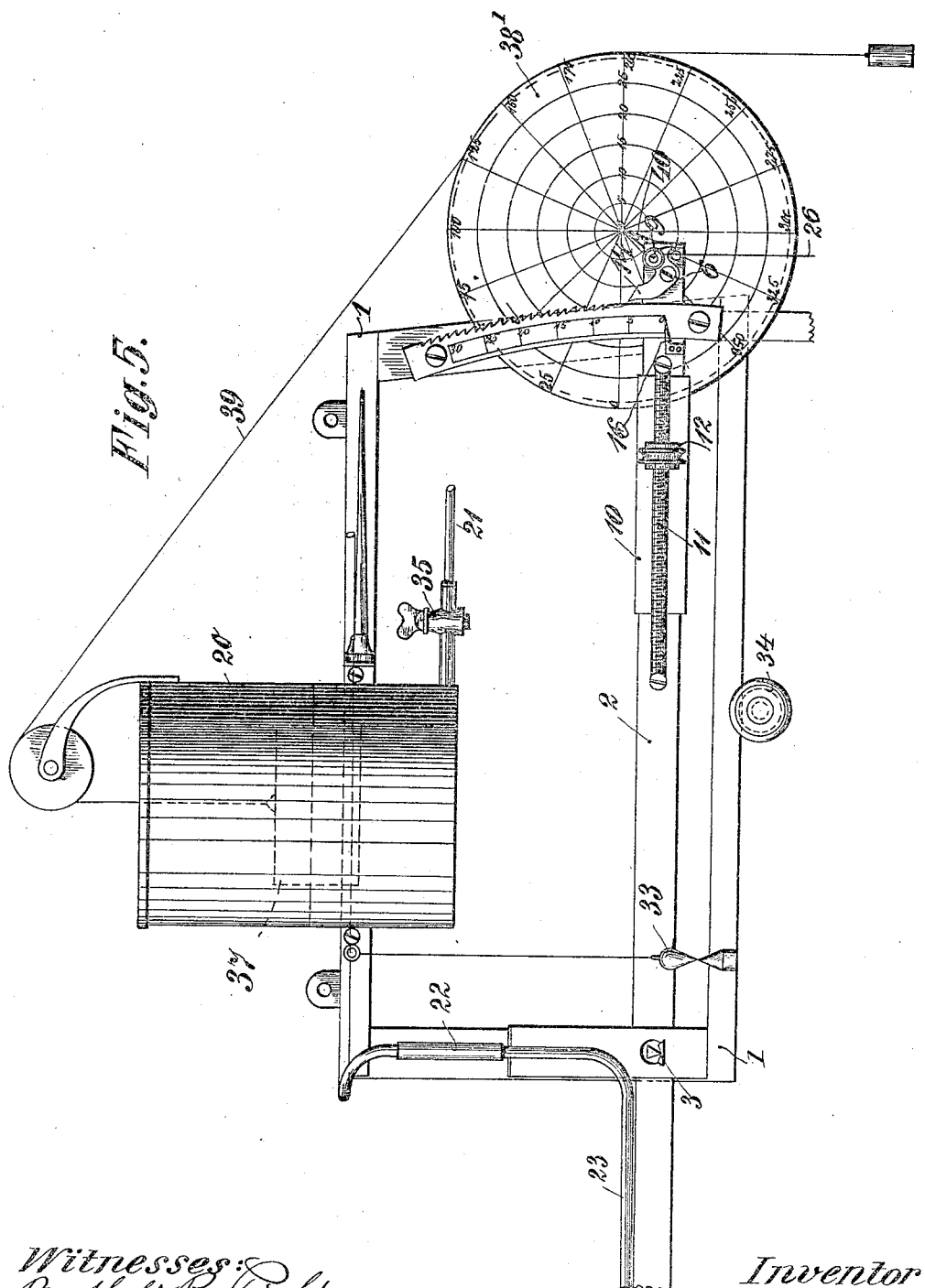

UNITED STATES PATENT OFFICE.

FERDINAND ZEDLITZ, OF HABENDORF, NEAR REICHENBERG, AUSTRIA-HUNGARY.

APPARATUS FOR TESTING THREADS, WIRES, STRIPS, &c.

946,743.

Specification of Letters Patent. Patented Jan. 18, 1910.

Application filed January 27, 1909. Serial No. 474,489.

*To all whom it may concern:*

Be it known that I, FERDINAND ZEDLITZ, a subject of the Austro-Hungarian Emperor, and resident of Habendorf, near Reichenberg, Bohemia, Austria-Hungary, have invented certain new and useful Improvements in Apparatus for Testing Threads, Wires, Strips, &c., of which the following is a specification.

This invention relates to an improved apparatus for testing the strength and elasticity of threads, wires, strips and so forth from materials of every description, in which a two armed lever which may be a balance lever, wheel, disk or the like, carries a graduated vessel forming the load and being filled with liquid until the material for testing becomes ruptured.

According to the present invention the two-armed lever is locked at the moment of breaking and utilized for indicating the elasticity. Thus, only one lever is used for testing the strength and elasticity of materials. Further, in my present arrangement the locking pawl the two-armed lever as well as a valve in the liquid supply pipe for the graduated vessel are connected with the material being tested and are therefore kept in operative condition until the said material breaks. At the moment of breaking the pawl falls automatically into engagement while the valve is closed by a spring so that the flow of liquid is immediately stopped.

For self registering and recording I connect with the apparatus a registering drum or disk which turns through the action of a float provided in the liquid supply tank. The drum or disk is furnished with a recording stylus which receives motion through the intervention of the two-armed lever.

The accompanying drawings show several forms of construction of my improved apparatus more particularly designed for the testing of yarns.

Figure 1:
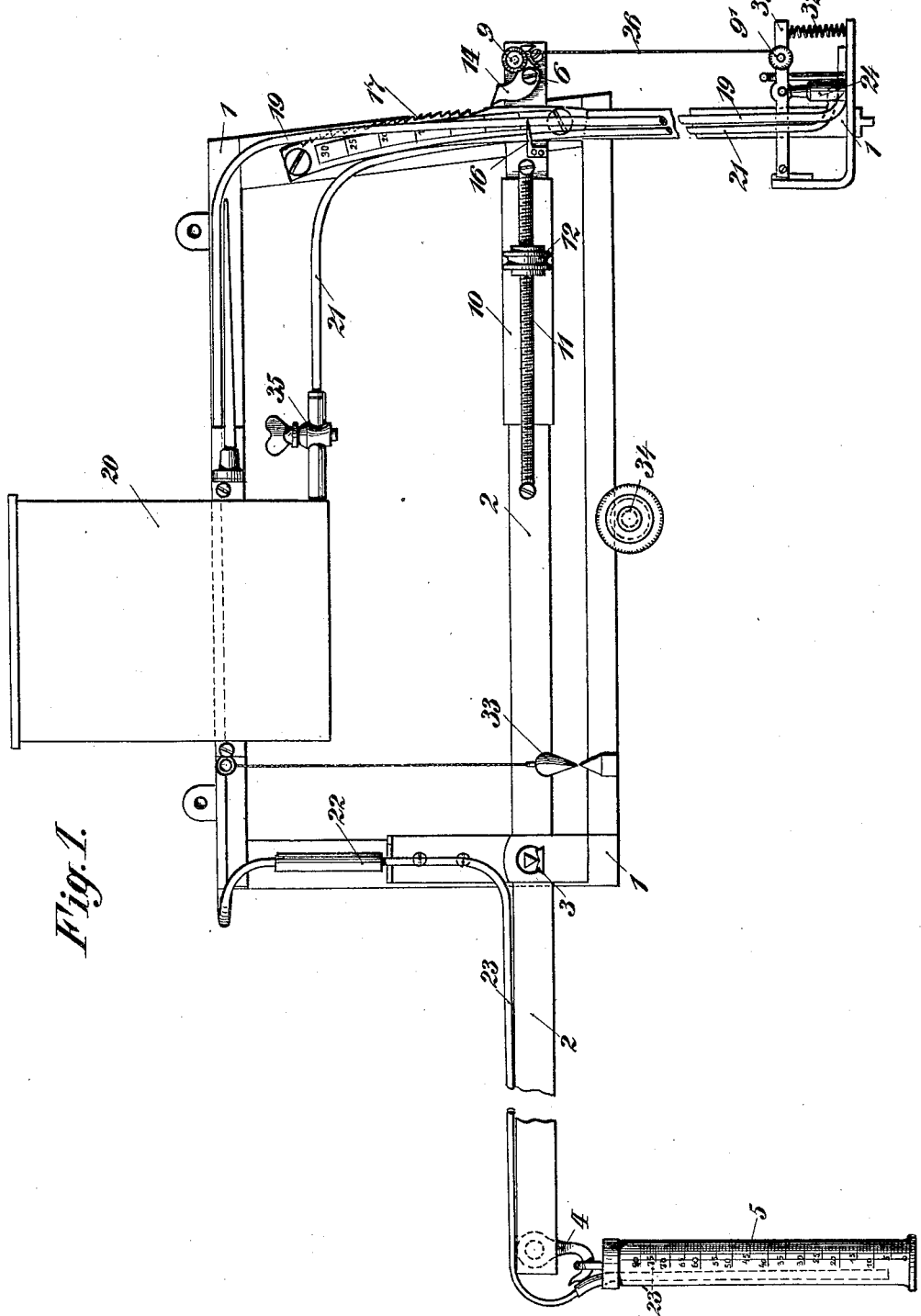
Figure 2:
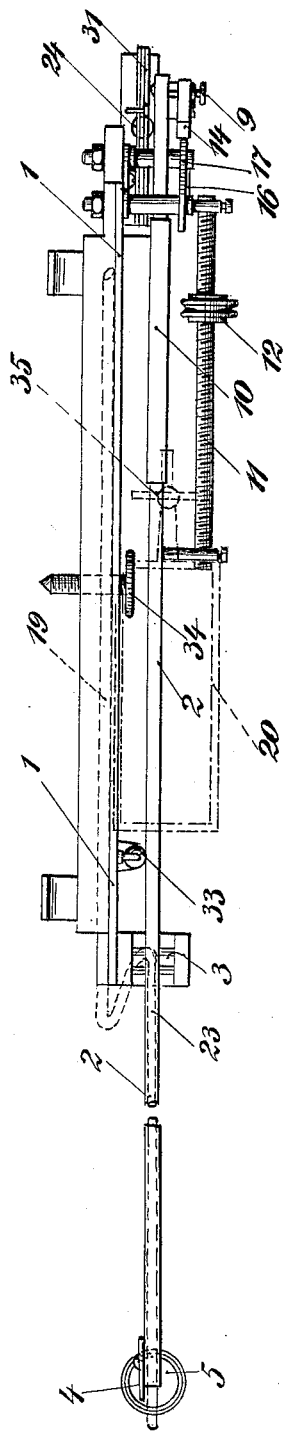
Figure 3:
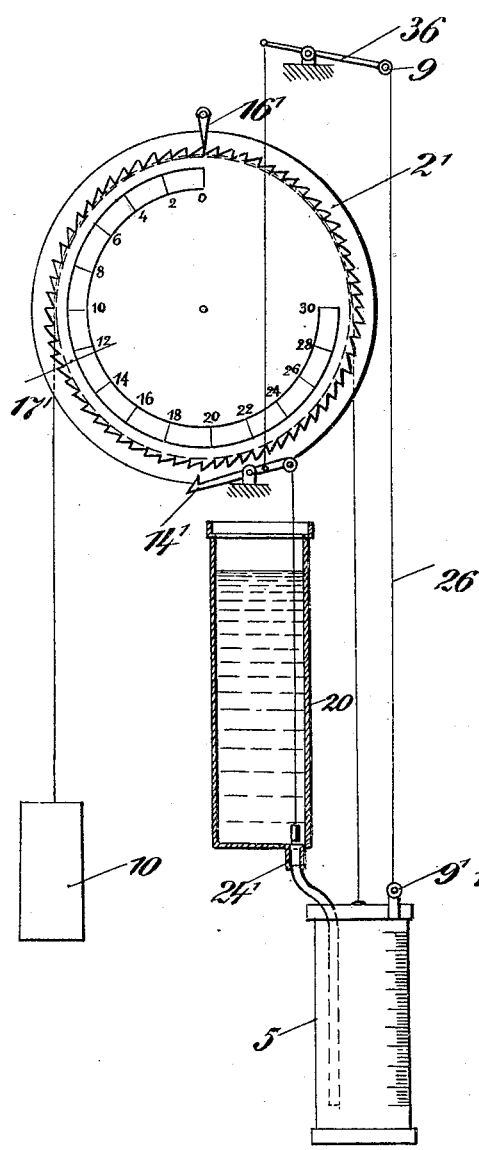
Figure 4:
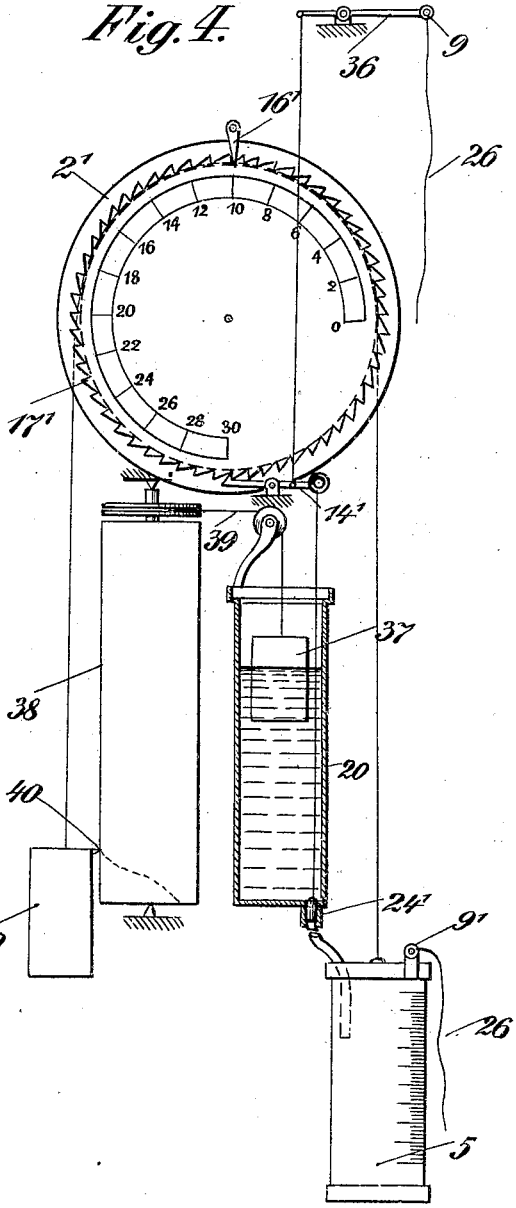

Figure 1 is a front elevation of the apparatus in which the two-armed lever has the form of a balance-beam. Fig. 2 is a corresponding plan view. Fig. 3 is a diagrammatical view of a modified construction in which the two-armed lever takes the form of a ratchet wheel; the various parts being shown in the position for starting the testing operation. Fig. 4 shows the same construction with the parts shown in the position which they assume at the breaking of the thread being tested, while at the same time the automatic recording device is shown as in action. Fig. 5 shows the apparatus illustrated in Figs. 1 and 2 provided with the automatic recording device.

In the construction shown in Figs. 1 and 2, the frame 1 is fitted with a two-armed lever 2 which is supported on a knife-bearing 3 in the usual manner of weighing scales; the arrangement being similar to that described in my prior specification filed May 4, 1908. The front end of the balance is furnished with a turnable hook 4 carrying the graduated glass vessel 5. The other arm of the balance 2 is fitted with a counterpoise 10. For accurate adjustment, a supplementary screw 11 and nut 12 are provided at the side of the said counterpoise. The means for testing the elasticity are directly connected with the balance 2, and the arm thereof which carries the counterpoise is fitted with a stud 6 serving as pivot for the locking pawl 14. The latter moves at the oscillation of the balance lever, over a toothed segment 17 fixed to the stationary frame 1. The segment is formed with a scale along which passes a pointer 16 fixed to the balance lever. The pawl 14 has two arms and the free arm is fitted with a binding screw 9 for retaining the end of the thread 26 for testing. The locking arm of the pawl is heavier than the free arm, thereby giving such pawl a constant tendency to engage in the teeth of the segment 17 while at the same time the stretched thread 26 keeps it out of engagement. The frame 1 carries a liquid tank 20 from which a pipe 21 leads to a valve 24 from which latter the pipe 19 leads along the upper part of the frame where it is connected with a flexible tube-portion 22 and another pipe 23 carried by the balance lever 2, the end of the said pipe 23 being fitted with a hose $23^1$ disposed in the interior of the graduated vessel 5. The plug of the valve 24 is connected with a lever arm 31 controlled by a spring 32 tending to close the valve. The lever arm 31 is furnished with a binding screw $9^1$ which retains the second end of the thread 26 for testing and in this manner insures the opening of the valve 24. The apparatus is furnished with a plumb 33 and with a set screw 34 for accurately hanging the apparatus.

An operation for testing a thread or yarn is carried out as follows:—The thread 26 is secured with one end to the screw 9 and with the other end to the screw 9¹ so that the valve 24 is opened and the pawl 14 disengaged. By opening the tap 35 the liquid from the tank 20 will run into the graduated vessel 5. Owing to the slowly increasing load and the gradual extension of the thread the balance lever 2 dips while at the same time the pawl 14 and pointer 16 move along the graduated toothed segment 17 until the thread breaks. At that moment the pawl 14 immediately engages in the nearest tooth and locks the balance lever. Simultaneously the valve 24 closes through the action of the spring 22 and interrupts the supply of liquid to the graduated vessel 5. The liquid in the latter indicates the breaking weight of the thread while the pointer 16 marks the elasticity of same. Naturally, the required information might be obtained by measuring the quantity of liquid discharged from the tank 20 instead of that supplied to the vessel 5.

Referring now to Figs. 3 and 4, the two-armed lever is here replaced by the wheel 2¹ to which are suspended the graduated vessel 5 on the one side and a counterpoise 10 on the other side. With the wheel 2¹ is directly connected a ratchet wheel 17¹ which is provided with a scale showing the angular deviation. In the ratchet wheel engages a pawl 14 connected by a cord with a two-armed lever 36, the free end of which latter is furnished with a binding screw 9 for use in securing one end of the thread 26 for testing. The other end of the thread is secured in the binding screw 9¹ in such a manner as to cause the pawl 14¹ to disengage from the ratchet wheel 17¹ as shown in Fig. 3. The pawl 14¹ carries the plug of the valve 24¹ by means of a cord so as to control the pipe leading to the graduated vessel 5. The arrangement is so devised as to have the valve 24¹ open when the pawl is disengaged, and closed when the pawl is engaged. It will, therefore, be clear that the breaking of the thread 26 will cause the pawl 14¹ to engage the ratchet and valve 24¹ to close the pipe as shown in Fig. 4. The stationary pointer 16¹ marks the elasticity while the amount of liquid in vessel 5 indicates the strength of the thread.

For automatically recording the tests, the apparatus is provided with the following parts:—The liquid tank 20 contains a float 37 which rotates a drum 38 through the intervention of a cord 39 and grooved pulley as shown in Fig. 4. The counterpoise 10 is suitably guided and carries a stylus 40 which moves along the rotating drum 38 during the working of the apparatus and so traces a curve denoting tensile strength of the material. The drum has a table from which the required data can be ascertained.

In Fig. 5 a similar recorder is shown in connection with the apparatus illustrated in Figs. 1 and 2. In this recording apparatus the registering drum 38 is replaced by a rotating disk 38¹ over which the stylus 40 is moved which is fixed to the two armed lever 2. The mode of operation of this apparatus is the same as that of the recording apparatus described above.

What I claim as my invention and desire to secure by Letters Patent is:—

1. In an apparatus of the kind described in combination, a two armed lever, a liquid receptacle attached to one arm of the said two armed lever, means for conducting a liquid into said receptacle, means for locking the said two armed lever on the breaking of the material being tested, means for cutting off the supply of liquid to the said receptacle on the breaking of the material being tested, and means in connection with the said two armed lever and adapted to indicate the elasticity of the material being tested, substantially as set forth.

2. In an apparatus of the kind described in combination, a two armed lever, a liquid receptacle attached to one arm of the said two armed lever, means for conducting a liquid into said receptacle, a valve in the said liquid conducting means, said valve being adapted to be held open by the material being tested, means for closing the said valve on the breaking of the material being tested, means for locking the said two armed lever on the breaking of the material to be tested, said locking means being adapted to be held disengaged by the material being tested, and means in connection with the said locking means and adapted to indicate the elasticity of the material being tested, substantially as set forth.

3. In an apparatus of the kind described in combination, a two armed lever, a graduated receptacle attached to one arm of the said two armed lever, a liquid vessel, a liquid conduit connected to the said liquid vessel and having its outlet within the said graduated receptacle, a valve in the said liquid conduit, said valve being adapted to be held open by the material being tested, means for closing the said valve on the breaking of the material being tested, means for locking the said two armed lever on the breaking of the material to be tested, said locking means being adapted to be held disengaged by the material being tested, and means in connection with the said locking means and adapted to indicate the elasticity of the material being tested, substantially as set forth.

4. In an apparatus of the kind described in combination, a two armed lever, a liquid receptacle attached to one arm of the said two armed lever, means for conducting a liquid into said receptacle, means for locking the said two armed lever on the breaking of the material being tested, means for cutting off the supply of liquid to the said receptacle on the breaking of the material being tested, means in connection with the said two armed lever and adapted to indicate the elasticity of the material being tested, and recording means operated by the swing of the said two armed lever and by the flow of the liquid conducted to the said liquid receptacle, substantially as and for the purpose set forth.

5. In an apparatus of the kind described in combination, a two armed lever, a graduated receptacle attached to one arm of the said two armed lever, a liquid vessel, a liquid conduit connected to the said liquid vessel and having its outlet within the said graduated receptacle, a valve in the said liquid conduit, said valve being adapted to be held open by the material being tested, means for closing the said valve on the breaking of the material being tested, means for locking the said two armed lever on the breaking of the material to be tested, said locking means being adapted to be held disengaged by the material being tested, means in connection with the said locking means and adapted to indicate the elasticity of the material being tested, a recording drum, and intermediate means for rotating the said recording drum through the liquid running out of the liquid vessel, a stylus adapted to be moved along the said recording drum, and intermediate means for moving the said stylus by the swing of the said two armed lever, substantially as and for the purpose set forth.

6. In an apparatus of the kind described in combination, a two armed lever, a graduated receptacle attached to one arm of the said two armed lever, a liquid vessel, a liquid conduit connected to the said liquid vessel and having its outlet within the said graduated receptacle, a valve in the said liquid conduit, said valve being adapted to be held open by the material being tested, means for closing the said valve on the breaking of the material being tested, means for locking the said two armed lever on the breaking of the material to be tested, said locking means being adapted to be held disengaged by the material being tested, means in connection with the said locking means and adapted to indicate the elasticity of the material being tested, a recording drum, a float provided in the said liquid vessel, and means to transmit the movement of the said float to the said recording drum, a stylus adapted to be moved along the said recording drum, and means connected to the said two armed lever and arranged to move the said stylus by the swing of the said two armed lever, substantially as and for the purpose set forth.

In testimony whereof I have hereunto signed my name this 14th day of January 1909, in the presence of two subscribing witnesses.

FERDINAND ZEDLITZ. [L. S.]

Witnesses:
FRANZ SIMON,
EDWARD TOLEYN.